(12) United States Patent
Hoffmann

(10) Patent No.: US 10,605,307 B1
(45) Date of Patent: Mar. 31, 2020

(54) BEARING RETAINER, BEARING AND ASSOCIATED METHOD

(71) Applicant: Regal Beloit America, Inc., Beloit, WI (US)

(72) Inventor: Kim D. Hoffmann, Chesterton, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 16/178,861

(22) Filed: Nov. 2, 2018

(51) Int. Cl.
*F16C 33/66* (2006.01)
*F16C 33/38* (2006.01)
*F16C 33/41* (2006.01)

(52) U.S. Cl.
CPC ........ *F16C 33/6651* (2013.01); *F16C 33/385* (2013.01); *F16C 33/3887* (2013.01); *F16C 33/414* (2013.01); *F16C 33/418* (2013.01); *F16C 33/6681* (2013.01); *F16C 2204/66* (2013.01); *F16C 2300/40* (2013.01)

(58) Field of Classification Search
CPC .... F16C 19/06; F16C 33/385; F16C 33/3887; F16C 33/414; F16C 33/418; F16C 33/6614; F16C 33/6629; F16C 33/6651; F16C 33/6681; F16C 2204/66; F16C 2300/40; F16C 43/065
USPC ........ 384/470, 523–524, 526–527, 531, 533, 384/473, 606
See application file for complete search history.

(56) References Cited

U.S. PATENT DOCUMENTS

| | | | |
|---|---|---|---|
| 1,715,848 A * | 6/1929 | Linde | F16C 33/41 384/531 |
| 2,742,332 A | 4/1956 | Cobb | |
| 3,471,208 A | 10/1969 | Vannest | |
| 3,743,369 A | 7/1973 | Langstrom | |
| 4,126,362 A * | 11/1978 | Hamblin | F16C 19/52 29/898.067 |
| 4,225,199 A * | 9/1980 | Earsley | F16C 33/416 384/470 |
| 4,324,444 A | 4/1982 | Buczynski et al. | |
| 4,420,195 A * | 12/1983 | Christen | F16C 33/416 384/526 |
| 4,541,739 A | 9/1985 | Allen et al. | |
| 4,744,679 A | 5/1988 | Verburg et al. | |
| 4,938,613 A * | 7/1990 | Griffin | F16C 33/416 384/526 |

(Continued)

FOREIGN PATENT DOCUMENTS

DE 10201177935 A1 12/2012
JP H0687722 U 12/1994
(Continued)

*Primary Examiner* — Marcus Charles
(74) *Attorney, Agent, or Firm* — Regal Beloit America, Inc.

(57) ABSTRACT

A bearing retainer for use in a bearing is provided. The bearing includes an inner ring, rolling elements and an outer ring. The bearing retainer includes a body. The body defines an inner periphery and an outer periphery of the body. The body further defines a plurality of inner walls. Each inner wall defines an opening extending from the inner periphery to the outer periphery of the body. The plurality of openings is adapted to receive one of the rolling elements. The inner walls are adapted to keep the rolling elements in a spaced apart relationship. Ribs extend inwardly from the inner periphery of the body.

20 Claims, 17 Drawing Sheets

(56) References Cited

U.S. PATENT DOCUMENTS

| | | | | |
|---|---|---|---|---|
| 5,230,570 | A | 7/1993 | Bursey et al. | |
| 6,276,836 | B1 * | 8/2001 | Suzuki | F16C 33/416 |
| | | | | 384/531 |
| 6,688,772 | B2 * | 2/2004 | Yamamoto | F16C 33/416 |
| | | | | 384/531 |
| 6,764,307 | B2 | 7/2004 | Metrikin | |
| 6,890,105 | B2 * | 5/2005 | Ide | F16C 33/416 |
| | | | | 384/470 |
| 7,044,645 | B2 * | 5/2006 | Yamamoto | F16C 33/416 |
| | | | | 384/523 |
| 7,507,028 | B2 | 3/2009 | Markle | |
| 8,360,653 | B2 | 1/2013 | Shaikh et al. | |
| 8,408,808 | B2 | 4/2013 | Hosmer | |
| 8,454,240 | B2 * | 6/2013 | Doyer | F16C 33/416 |
| | | | | 384/470 |
| 8,568,035 | B2 * | 10/2013 | Claude | F16C 33/414 |
| | | | | 384/531 |
| 8,888,375 | B2 | 11/2014 | Brock | |
| 9,057,405 | B2 | 6/2015 | Hofmann et al. | |
| 9,546,682 | B2 * | 1/2017 | Cislo | F16C 33/6614 |
| 9,829,042 | B2 * | 11/2017 | Batalha | F16C 33/6629 |
| 9,939,017 | B2 * | 4/2018 | Maeoka | F16C 33/416 |
| 9,945,421 | B2 | 4/2018 | Chougule | |
| 2002/0126927 | A1 | 9/2002 | Compassi | |
| 2013/0272638 | A1 | 10/2013 | Mola | |
| 2014/0054102 | A1 * | 2/2014 | Adane | F16C 33/3887 |
| | | | | 180/443 |
| 2015/0049977 | A1 | 2/2015 | He | |
| 2015/0377289 | A1 | 12/2015 | Scheidel et al. | |
| 2018/0010640 | A1 | 1/2018 | Kamath | |

FOREIGN PATENT DOCUMENTS

| | | | | |
|---|---|---|---|---|
| SU | | 557215 A1 | 6/1977 | |
| WO | WO-2015141642 A1 * | | 9/2015 | F16C 19/10 |

\* cited by examiner

BEARING RETAINER, BEARING AND ASSOCIATED METHOD

BACKGROUND OF THE INVENTION

The embodiments described herein relate generally to bearings, and more specifically, to a retainer for a rolling element bearing.

Bearing assemblies are utilized to permit the relative motion of one machine component or assembly with respect to another machine component or assembly. The bearing assembly typically has a first bearing component, for example an inner ring, that is fixed to a first machine component and a second component, for example an outer ring that is fixed to a second machine component. The first bearing component is permitted to have relative motion, typically to rotate, relative to the second bearing component.

Many bearing assembly applications provide for the rotation of the inner element which is secured to a shaft while the outer element is secured to a housing. Typically, the inner element rotates, but many applications provide for the outer element rotating and the inner element stationary.

Often the bearing assembly is mounted in a housing and the inner element which is secured to a shaft. The housing may be in the form of a housing with a mounting arrangement for mounting to a surface with fasteners.

The rotation of the second component may be permitted by providing mating cylindrical surfaces between the components, where are typically known as sleeve bearings, as one of the two components is typically sleeved with a material that provides low friction rotation between the moving components.

Alternatively, a widely used configuration to permit rotation between the components is in the form of a set of rolling elements that are positioned between the cylindrical surface of one component and the cylindrical surface of the second component. The rolling element may be balls, needles, cylinders or cylinders with spherical outer peripheries, also known as spherical rollers. A single row of rolling elements may be used, or two or more rows may be used in a spaced apart configuration. The rolling elements may be placed in adjoining relationship on the outer periphery of the inner element and on the inner periphery of the outer element. Alternatively, the rolling elements may be positioned in a spaced apart relationship, separated from each other by a separator in the form of a retainer or cage. The rolling elements and the inner element, ring or race and the outer element, ring or race form a rolling element bearing.

Separators or bearing retainers serve to separate adjacent rolling elements and to generally direct the rolling elements as they roll in the bearing races of the bearing inner ring and the bearing outer ring. Typically, the separators are supported by the rolling elements and float between the inner ring and the outer ring of the bearing.

Lubricants are used to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. This grease and the lubricating oil that is suspending in the grease are available for replenishment as the oil is consumed by the bearing.

The grease that tends to move away from the path of the rolling elements during use tends to move out to the sides and outer periphery of the bearing during operation due to centrifugal forces. This grease may not readily return to lubricate the bearing races when needed. Further this grease on the peripheries of the bearing may be washed out of the bearing during extremely wet and dry ambient operating conditions. These factors lead to either premature bearing failure or increased maintenance costs included more frequent lubrication of the bearings.

Separators may be made by any suitable process and be made of any suitable material. Typically, separators are made from two pieces stamped metal, formed to conform to the rolling elements and riveted together. Alternatively, separators may be machined from a metal, for example brass, or be molded from a polymer or a composite.

Metal separators require expensive tooling and equipment, much of which may be dedicated to a particular separator size. Further, the riveting of the stamped metal separators may result in missing rivets, contamination or other manufacturing issues. The stamped metal separators may not provide adequate rolling element guidance which may result in noise or other quality issues.

Alternatively, the separator may be made from a polymer. The polymer cage can closely conform to the rolling elements and be positioned radially by the rolling elements.

Alternatively, the inner ring may include lands that extend radially outwardly from the outer diameter of the inner ring. The separator may be positioned or supported radially by the lands of the inner ring.

The separator straddles both lands on the inner of a ring and typically does not have a lot of clearance between the ID of the cage and the lands of the inner ring. Supporting the separator by the lands may make it difficult for the lubrication to pass between the separator and the lands to proper lubricate the bearing raceways.

The present invention is directed to alleviate at least some of these problems with the prior art.

BRIEF DESCRIPTION OF THE INVENTION

According to an aspect of the invention a bearing retainer for use in a bearing including an inner ring, rolling elements and an outer ring is provided. The bearing retainer includes a generally cylindrical body. The body has a first face, a second face opposed to the first face, and an outer periphery extending from the first face to the second face. The body also has an inner periphery extending from the first face to the second face. The inner periphery defines a central opening in the body. The body also has a plurality of spaced apart protrusions extending outwardly from the second face.

Adjacent pairs of the plurality of spaced apart protrusions define a pocket between the protrusions for guiding one of the rolling elements. Each of the plurality of spaced apart protrusions define opposed radially inward and radially outward surfaces. A portion of the radially inward surface defines a radially inwardly extending rib.

According to another aspect of the invention, the bearing retainer may be provided wherein at least one of the radially outward surfaces of the plurality of spaced apart protrusions define a radially inwardly extending cavity for receiving and storing lubricant.

According to another aspect of the invention, the bearing retainer may be provided wherein the body defines a passageway therein, the passageway extending from the second face to the radially inwardly extending cavity.

According to another aspect of the invention, the bearing retainer may be provided wherein at least one of the ribs has a generally rectangular cross section in a plane normal to an axis of rotation of the body.

According to another aspect of the invention, the bearing retainer may be provided wherein each of the ribs is centrally aligned with respect to adjacent pockets.

According to another aspect of the invention, the bearing retainer may be provided wherein each of the plurality of spaced apart protrusions define a shoulder for limiting the axial movement of the rolling element toward the first face of the body.

According to another aspect of the invention, the bearing retainer may be provided wherein each of the pockets closely conforms to one of the rolling element.

According to another aspect of the invention, the bearing retainer may be provided wherein each of the pockets has a concave surface closely conforming to a convex surface of one of the rolling element.

According to another aspect of the invention, the bearing retainer may be provided wherein the outer periphery of the body closely conforms to the outer ring of the bearing.

According to another aspect of the invention, a bearing including an inner ring defining an inner race and an outer ring defining an outer race is provided. The bearing also includes a plurality of rolling elements adapted to move along the inner race and the outer race and a bearing retainer positioned between the inner ring and the outer ring and including a generally cylindrical body. The body has a first face, a second face opposed to the first face and an outer periphery extending from the first face to the second face.

The body also has an inner periphery extending from the first face to the second face. The inner periphery defines a central opening in the body. The body also has a plurality of spaced apart protrusions extending outwardly from the second face.

Adjacent pairs of the plurality of spaced apart protrusions define a pocket between the protrusions for guiding one of the rolling elements. Each of the plurality of spaced apart protrusions define opposed radially inward and radially outward surfaces. A portion of the radially inward surface defining a radially inwardly extending rib.

According to another aspect of the invention, the bearing may be provided wherein at least one of the radially outward surfaces of the plurality of spaced apart protrusions define a radially inwardly extending cavity for receiving and storing lubricant.

According to another aspect of the invention, the bearing may be provided wherein the radially inwardly extending cavity and the pocket are defined by a wall of generally constant thickness therebetween.

According to another aspect of the invention, the bearing may be provided wherein the body defines a passageway in the body. The passageway extends from the second face to the radially inwardly extending cavity.

According to another aspect of the invention, the bearing may be provided wherein the passageway extends to the outer periphery of the body.

According to another aspect of the invention, the bearing may be provided wherein at least one of the ribs has a generally rectangular cross section in a plane normal to an axis of rotation of the body.

According to another aspect of the invention, the bearing may be provided wherein at least one of the ribs is tapered in the direction of an axis of rotation of the body.

According to another aspect of the invention, the bearing may be provided wherein each of the plurality of spaced apart protrusions define a shoulder for limiting the axial movement of the rolling element toward the first face of the body.

According to another aspect of the invention, the bearing may be provided wherein at least one of the ribs is skewed in the direction of an axis of rotation of the body.

According to another aspect of the invention, a method for guiding and lubricating rolling elements in a bearing is provided. The method includes the step of providing a bearing having an inner ring, an outer ring and a plurality of rolling elements. The method also includes the step of positioning a bearing retainer between the inner ring and the outer ring. The bearing retainer has a first face, a second face opposed to the first face, an outer periphery extending from the first face to the second face, an inner periphery extending from the first face to the second face, and a plurality of spaced apart protrusions extending outwardly from the second face.

The method also includes the step of forming a plurality of pockets with adjacent pairs of the plurality of spaced apart protrusions and the step of guiding one of the plurality of rolling elements with each of the plurality of pockets.

The method also includes the step of forming radially inwardly extending and axially extending ribs on the inner periphery of the bearing retainer and the step of juxtaposing grease into the bearing retainer;

The method also includes the step of accumulating grease on a surface of the protrusions as the retainer is rotated and the step of releasing lubrication from the grease.

According to another aspect of the invention, the method may be provided wherein the step of positioning a bearing retainer includes the step of closely conforming the outer periphery of the retainer to the outer ring.

DETAILED DESCRIPTION OF THE INVENTION

The method, systems and apparatus described herein facilitate the guiding of rolling elements in a bearing and the lubrication of the rolling elements in a bearing. Separators serve to separate adjacent rolling elements and to generally direct the rolling elements as they roll in the bearing races of the bearing inner ring and the bearing outer ring. Typically, the separators are supported by the rolling elements and float between the inner ring and the outer ring of the bearing. Lubricants are used to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. The separator may trap a portion of the grease away from the path of the rolling elements. Improvement in the guiding of the rolling elements and in their lubrication may improve the life of the bearing.

The methods, systems, and apparatus described herein assist in improved guidance of the rolling element and in improved lubrication of the bearing contact surfaces. The methods, systems, and apparatus described herein may also facilitate assembly speed and accuracy. Furthermore, the methods, systems, and apparatus described herein provide for an improved appearance of the bearing and its appeal to the customer.

Technical effects of the methods, systems, and apparatus described herein include at least one of improved performance and quality and reduced labor costs.

Figure 1:
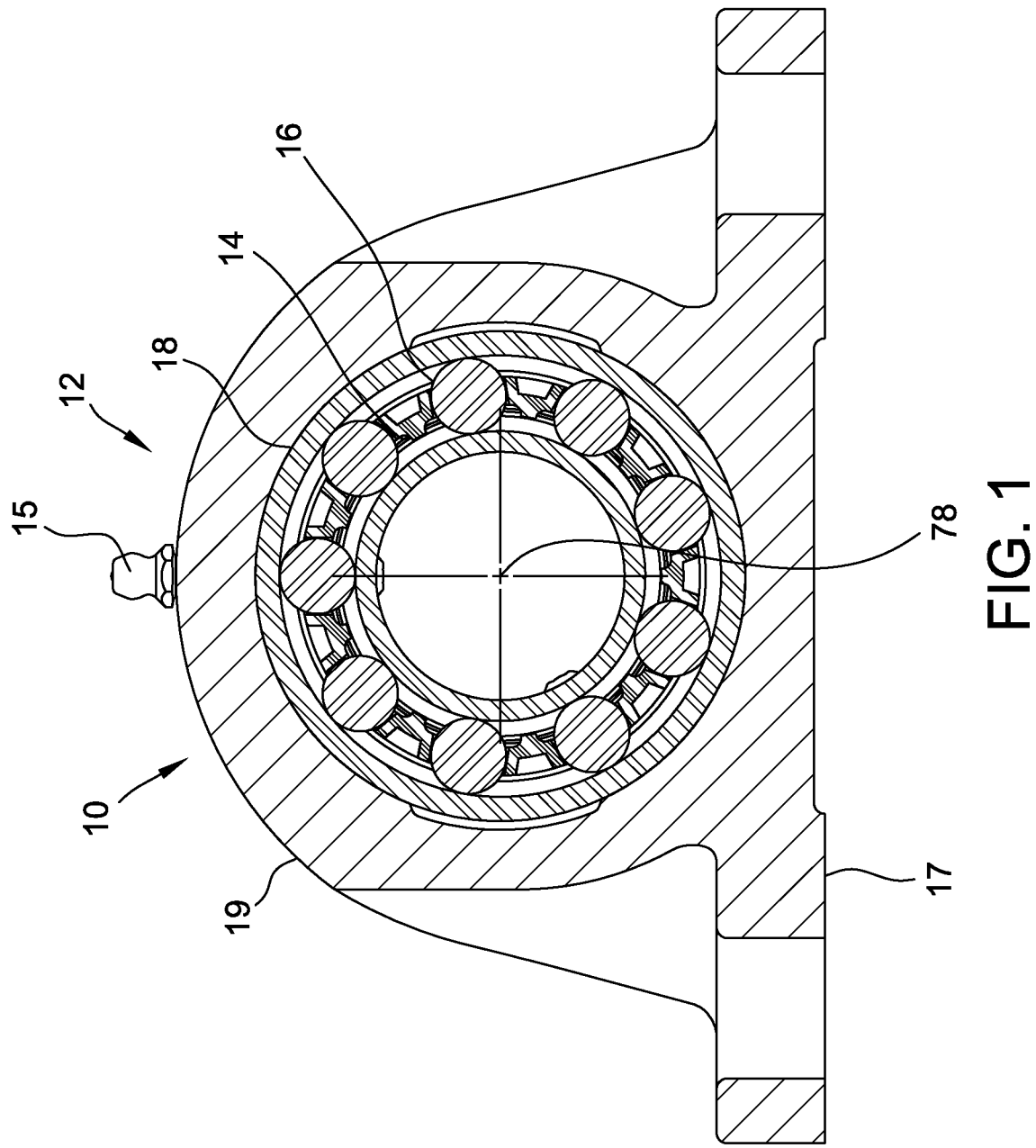
FIG. 1 is a perspective view, partially in cross section, of an embodiment of the present invention in the form of a pillow block or floor mounted bearing assembly.
Figure 2:
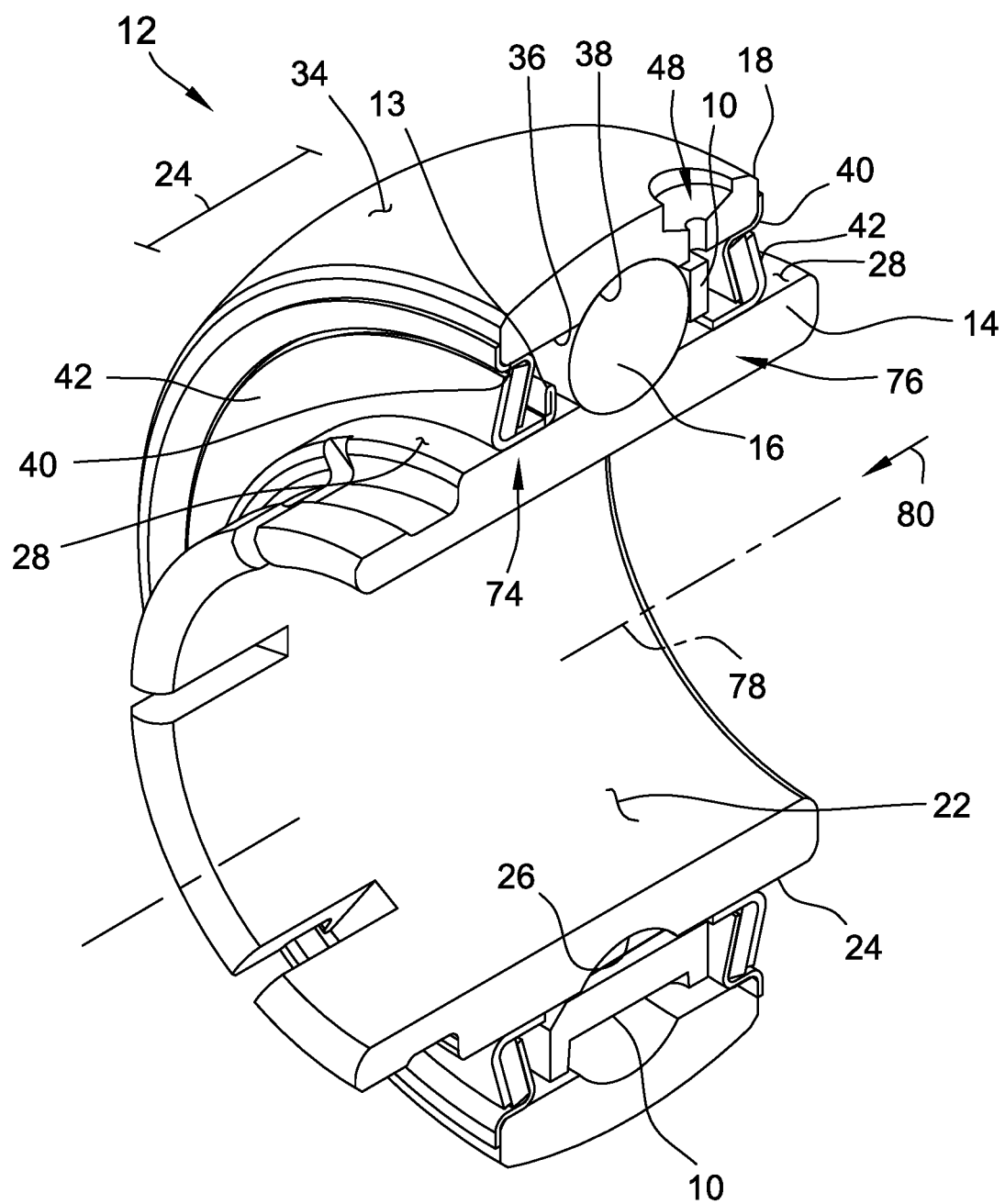
FIG. 2 is a perspective view, partially in cross section, of an embodiment of the present invention in the form of a bearing cartridge or enclosed bearing assembly that may be used in the pillow block of FIG. 1 showing a retainer with fingers pointing toward collar.
Figure 3:
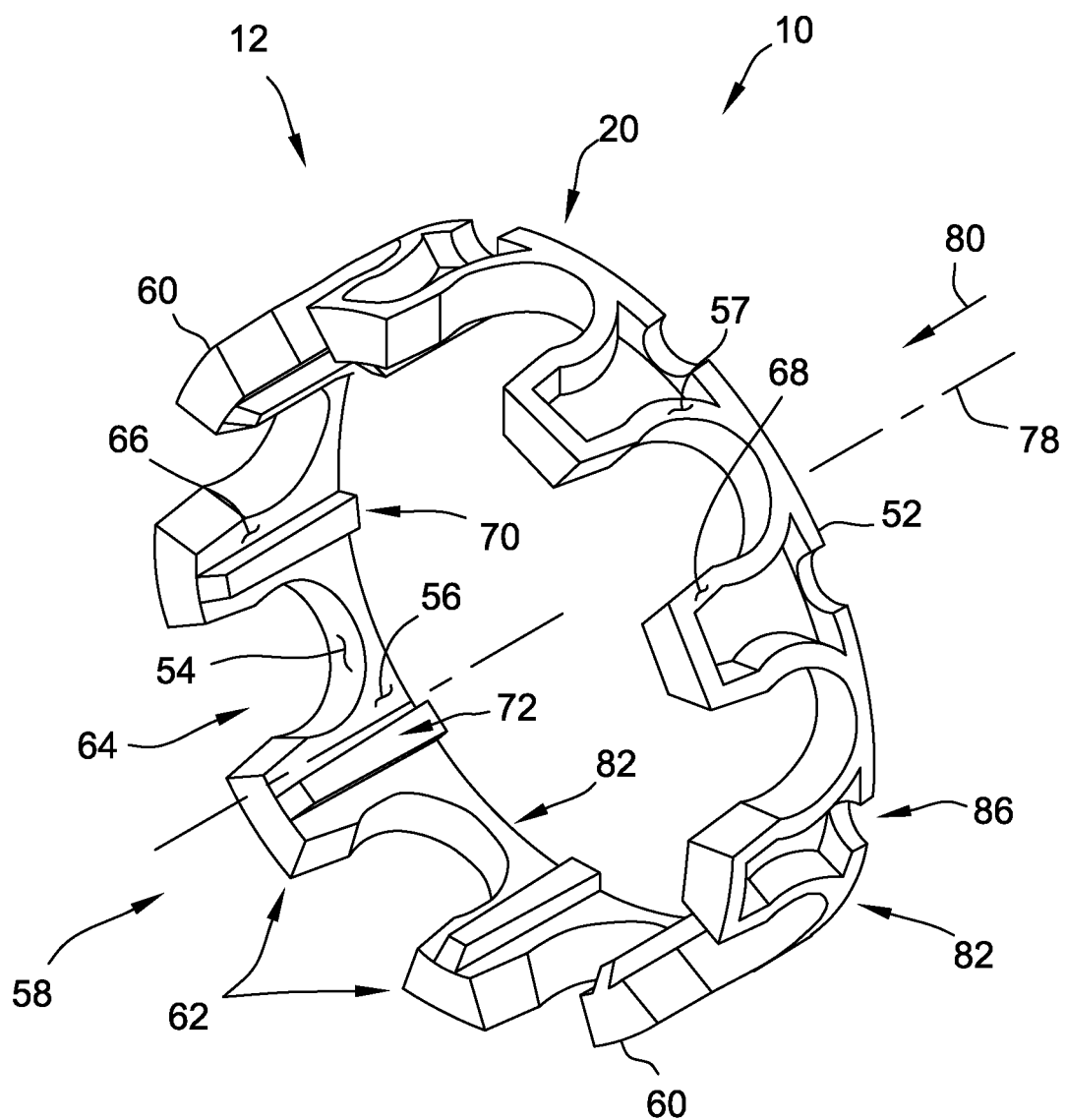
FIG. 3 is a perspective view of an embodiment of the present invention in the form of a bearing retainer that may be utilized in the cartridge of FIG. 2 and/or in the pillow block of FIG. 1.

According to an embodiment of the invention and referring to FIG. 1-3, a bearing retainer 10 for use in a bearing 12 is provided. The bearing 12 includes an inner ring 14, rolling elements 16 and an outer ring 18. The bearing retainer 10 includes a generally cylindrical body 20.

As shown in FIGS. 1 and 2, the invention may be utilized where the rolling elements 16 are spherical shaped or are in the form of balls 16. Such bearings 12 are typically called ball bearings 12 and include a plurality of equally spaced apart balls 16.

It should be appreciated that the rolling elements may be cylindrically-shaped or barrel shaped. Barrel shaped rolling elements are typically called spherical roller bearings and are very commonly used for application with heavy loads and/or for applications where misalignment and/or shaft deflection may be an issue. Cylindrical bearings are used, for example, in applications where loading is heavy. It should be appreciated that for use of the retainer of the present invention in connection with cylindrically-shaped or roller shaped rolling elements, the retainer is preferably designed with pockets for retaining the rolling elements that closely conform with and guide the rolling elements.

As shown in Figures l and 2, the invention may be utilized where the bearing 12 is mounted in a housing 19. As shown in FIG. 1, the housing 19 may be a pillow block 19 that includes a base 17 for mounting to an application, for example, a machine (not shown). The pillow block 19 may also include a grease fitting, for example, a zerk fitting 15. The zerk fitting 15 may receive grease 13 that may be advanced to the bearing 12. The bearing 12 may, alternatively, be directly placed in an application, for example, a machine.

The inner ring 14, the rolling elements 16 and the outer ring 18 of the bearing typically absorb or transfer the load involved in the application and, as such, the inner ring 14, the rolling elements 16 and the outer ring 18 are made of a suitable durable material.

Typically, the inner ring 14, the rolling elements 16 and the outer ring 18 are made of a metal, for example a ferrous material, for example steel. For example, the inner ring 14, the rolling elements 16 and the outer ring 18 are made of a through hardened steel alloy or a case-hardened steel alloy.

As shown in FIG. 2, the inner ring 14 includes a cylindrical bore or inner periphery 22 and a generally cylindrical outer periphery 24. The outer periphery 24 may, as shown, include a concave bearing inner race 26 conforming to the rolling elements 16 and cylindrical inner lands 28 extending radially outwardly in both directions from the bearing inner race 26.

The bore 22 of the inner ring 14 is fitted to shaft knot shown) of the equipment (not shown) to be rotatably supported. The shaft may, for example, be fixedly fitted to the shaft by any suitable means. For example, the shaft may be fitted to the shaft, by a set screw (not shown), by an interference fit or by a collar (not shown) that is used to compress the inner ring 14.

As shown in FIG. 2, the outer ring 18 includes an outer periphery 34 that may, for example be cylindrical or, as shown be a portion of a sphere. The outer ring 18 also includes an inner periphery 36 that may, as shown, include a concave bearing outer race 38 conforming to the rolling elements 16 and cylindrical outer lands 40 extending radially inwardly in both directions from the bearing outer race 38.

As shown in FIG. 2, the bearing 12 may include seals 42 for retaining lubricant 13 in the form of for example grease 13. As shown, the seals 42 may be fitted to the cylindrical inner lands 28 and to the cylindrical outer lands 40. A radially extending opening 48 may be formed in outer ring 18 to permit the grease 13 to enter the bearing 12 and be stored between the seals 42.

Figure 4:
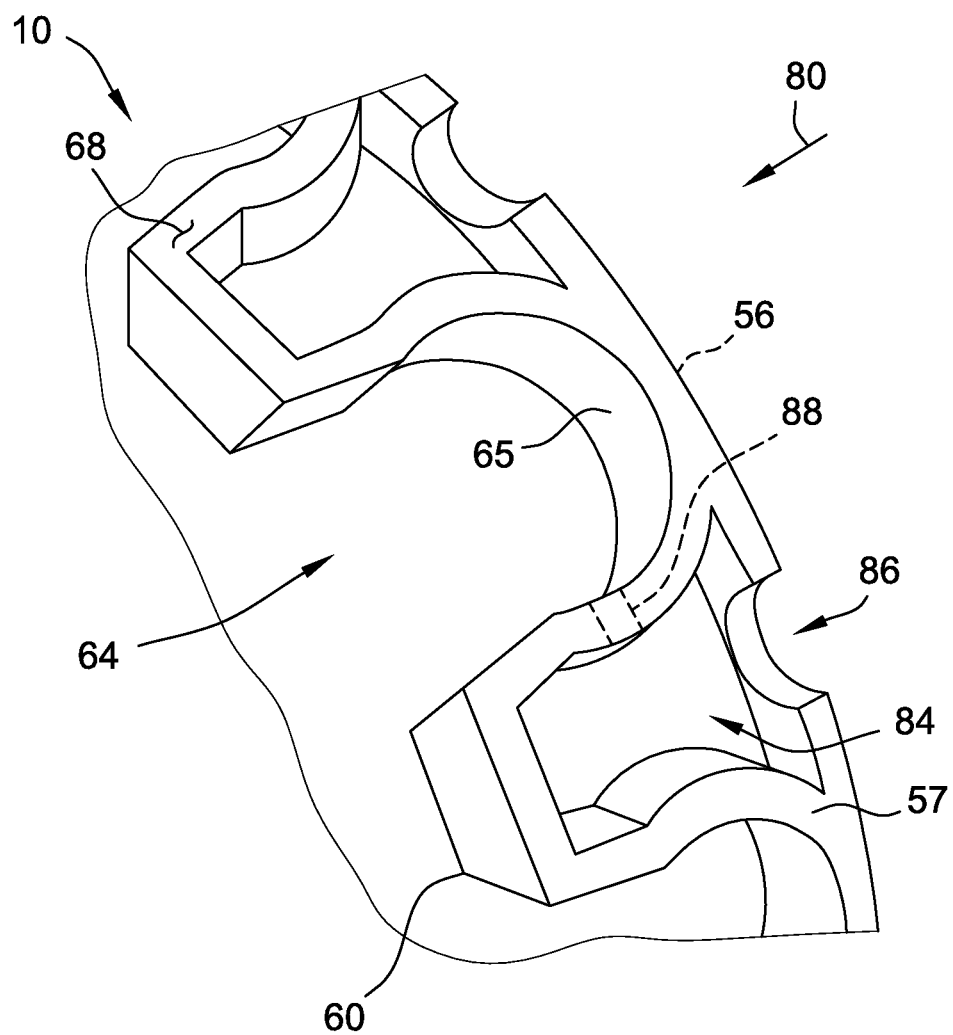
FIG. 4 is a partial perspective view of the bearing retainer of FIG. 3 showing grease retaining pockets formed in the outer periphery of the retainer in greater detail.

Referring now to FIGS. 3-5, the retainer or separator 10 is described in greater detail.

As shown in FIG. 3, the body 20 has a first face 52, a second face 54 opposed to the first face 52, and an outer periphery 57 extending from the first face 52 to the second face 54. The body 20 also has an inner periphery 56 extending from the first face 52 to the second face 54. The inner periphery 56 defines a central opening 58 in the body 20. The body 20 also has a plurality of spaced apart protrusions or fingers 60 extending outwardly from the second face 54. The fingers 60 serve to separate and guide the rolling elements or balls 16.

Adjacent pairs 62 of the plurality of fingers 60 define pockets 64 between the fingers 60. Each pocket 64 guides one of the rolling elements 16. The fingers 60 may have guiding surfaces 65 that contact the rolling elements 16. When as shown the rolling elements 16 are spheres or balls, the guiding surfaces 65 are preferably concave to closely conform to the balls 16. Each of the plurality of spaced apart protrusions 60 define a radially inward surface 66 and an opposed radially outward surface 68 opposed to the radially inward surface 66. A rib 70 extends inwardly from radially inward surface 66 and is used to support the retainer 10 on inner ring 14 and to permit grease 13 to flow between the inner ring 14 and the retainer 10. The rib 70 includes a distal surface 72 that mates with the cylindrical inner lands 28 of inner ring 14 of the bearing 12. As the cylindrical inner lands 28 are convex, the distal surface 72 may be concave to match the lands 28. Alternatively, the distal surface 72 may be flat or planar.

As shown in FIGS. 1-3, the bearing retainer or separator 10 may be positioned in the space between the outer ring 14 and the inner ring 18. The retainer 10 may be designed such that the retainer 10 is positioned in the space by the fit between the rolling elements 16 and the guiding surfaces 65 of the fingers 60. In such a floating or rolling element guided retainer, the retainer 10 is rolling element guided or supported solely be the rolling elements. In such a floating or rolling element guided retainer, the outer periphery 57 of the retainer 10 is spaced from the outer ring 18 of the bearing 12 and the inner periphery 56 of the retainer 10 is spaced from the inner ring 14 of the bearing 12.

It should be appreciated that the retainer may be supported by the outer ring, by the inner ring or by a combination of the outer ring and the inner ring. Typically, if the retainer is supported by a bearing ring, either the support is by the inner ring or by the outer ring.

It should be appreciated that the lubricant storing, lubricant guiding and lubricant dispensing features of the present invention may be accomplished with a bearing is any of a bearing with a rolling element guided retainer, a bearing with an outer ring guided retainer or bearing with an inner ring guided retainer, are any combination thereof.

If the retainer is supported by the inner ring (an inner ring guided retainer), the outer periphery of the retainer 10 is spaced from the outer ring 18 of the bearing 12 and the inner periphery 56 of the retainer 10 is matingly fitted to the inner ring 14 of the bearing 12. Conversely, if the retainer is supported by the outer ring (an outer ring guided retainer), the outer periphery 57 of the retainer 10 is matingly fitted to the outer ring 18 of the bearing 12 and the inner periphery 56 of the retainer 10 is spaced from the inner ring 14 of the bearing 12.

As shown in FIGS. 1-5 the retainer 10 is preferably used as an inner ring guided retainer. The rib 70 radially positions the retainer 10 relative to the inner ring 14 by engaging with the lands 28. It should be appreciated that to properly position the retainer 10 relative to the inner ring 14, a plurality of ribs 70 are positioned on the fingers 60, extending inwardly from the radially inward surface 66. While as few as three ribs 70 may be sufficient, as shown each finger 60 has a rib 70. It should be appreciated that plurality of ribs may be placed on a single finger.

As shown, one rib 70 is centrally position on the radially inward surface 66 of each finger 60. The rib 70 preferable extends along axis 78 of rotation of the bearing 12 sufficiently such that the distal surface 72 of the rib 70 engages both lands 28 of the inner ring 14.

The rib 70 may have any size and shape capable of providing support for the retainer 10 and to permit grease 13 to flow between the inner ring 14 and the retainer 10. As shown the rib 70 has a uniform rectangular cross section and extends in a direction along axis 78 of rotation of the bearing 12. It should be appreciated that the rib may have any cross-sectional shape, for example a semicircular cross-sectional shape, a trapezoidal cross-sectional shape, a triangular cross-sectional shape or any other shape. It should be appreciated that the rib may extend in a direction along axis 78 that is skewed. The rib orientation may be skewed clockwise or counter clockwise, have a herringbone orientation. Such a skewed orientation may urge grease 13 axially to either to bearing face.

The retainer 10 may be positioned, as shown in FIGS. 1 and 2, within the bearing 12 with the first face 52 of the retainer 10 positioned opposed to the collar and the fingers 60 positioned adjacent to the collar. The retainer 10 and the seals 42 define a collar side cavity 74 between the retainer and one of the seals and between the rings 14 and 18 and an opposed side cavity 76 between the retainer and the other seal 42 and between the rings 14 and 18. It should be appreciated that the opposite positioning of the retainer 10 within the bearing 12 may be desired.

When the fingers 60 are positioned adjacent to the collar, grease 13 may enter the bearing 12 through the radial opening 48 and fill the opposed side cavity 76. Grease 13 from the opposed side cavity 76 may be advanced in the direction of arrow 80 between the radial inward surface 66 of the retainer 10 and the inner land 28 of inner ring 14 toward collar side cavity 74.

Figures 5A, 5B:
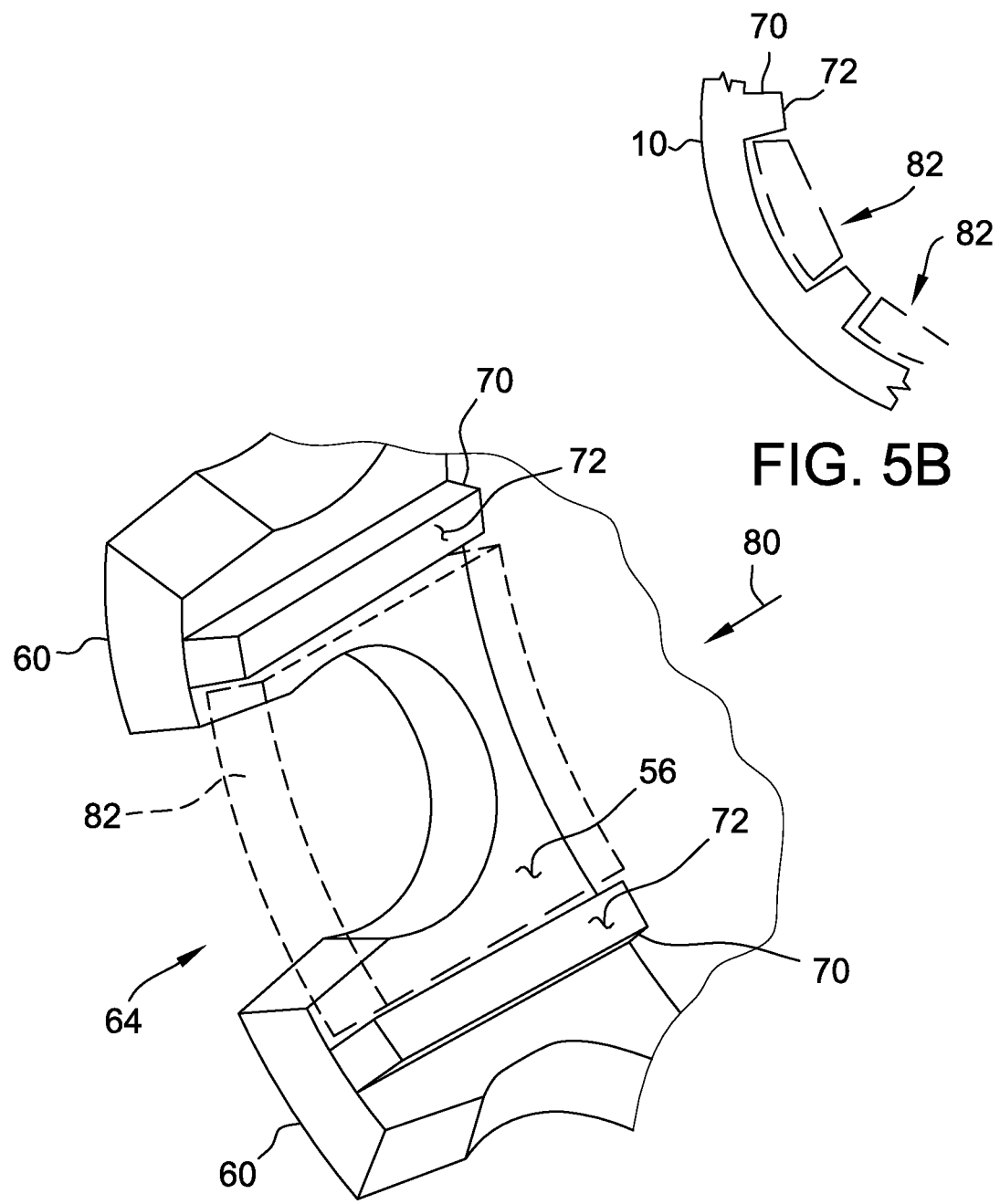
FIG. 5A is a partial perspective view of the bearing retainer of FIG. 3 showing ribs located on the inner periphery of the retainer in greater detail.
FIG. 5B is a partial cross-sectional view of the bearing retainer of FIG. 5A showing the retainer for grease located on the inner periphery of the retainer in greater detail.

As shown in FIGS. 5 and 5A, a plurality of spaced apart inner cavities 82 corresponding to the pockets 64 and shown in phantom is formed between the cylindrical inner lands 28 of inner ring 14, the radial inward surface 66 of the retainer, adjacent ribs 70 and the distal surface 72 of the ribs 70. Each of these cavities 82 forms an inner reservoir 82 for storing grease 13. As the bearing 12 and retainer 10 rotate with use, grease 13 remains within the bearing in ample supply and adjacent to the rolling elements.

As shown in FIGS. 3 and 4 at least one of the fingers 60 of the retainer 10 may define a finger cavity 84 extending inwardly from radial outward surface of finger 60. The finger cavity 84 may have any suitable shape, but to maximize the side of the cavity 84 the finger 60 may have a uniform thickness from arcuate bottom surface 85 of the cavity to the radial inward surface 66 of the finger 60. The finger 60, as shown, also may have a uniform thickness from the guiding surface 65 to the cavity 84. While only some of the fingers 60 may include the finger cavity 84, to maximize the amount of grease in the cavities 84 each of the fingers 60 may, as shown, include a finger cavity 84, Each of these finger cavities 82 forms an outer reservoir 84 for storing grease 13.

Note that the radially outward surface 68 or outer periphery 57 of the retainer closely conforms to the cylindrical outer lands 40 of the outer ring 18. This close conformance restricts the amount of grease that may pass between the outer ring 18 and the retainer 10 from the opposed side cavity 76 to the finger cavities 82.

According to an aspect of the invention and referring now to FIG. 4, a first pathway or first channel 86 may be formed in the retainer 10 between the finger cavity 82 and first face 52 of the retainer 10. The first pathway or first channel 86 may have any shape and may as shown be semicircular. To provide sufficient grease 13, the first pathway 86 may be, as shown, open at outer periphery 57 of retainer 10. Any other shape for the first pathway 86 may be used. For example, the pathway may be circular, rectangular or any other shape.

To advance grease in the direction of arrow 80 toward the finger cavities 82, grease 13 from the opposed side cavity 76 may be advanced through the first pathway or first channel 86 and between the outer land 40 and retainer 10. As the bearing 12 and retainer 10 rotate with use, grease 13 remains within the bearing 12 in finger cavities 82 in ample supply and adjacent to the bearing outer race 38.

A second channel or pathway 88 may be positioned between the finger cavity 82 and the guiding surface of the retainer 10 to provide direct access of the grease 13 from the finger cavities 82 to the pockets 64 to lubricate the rolling elements 16 directly.

Figure 6:
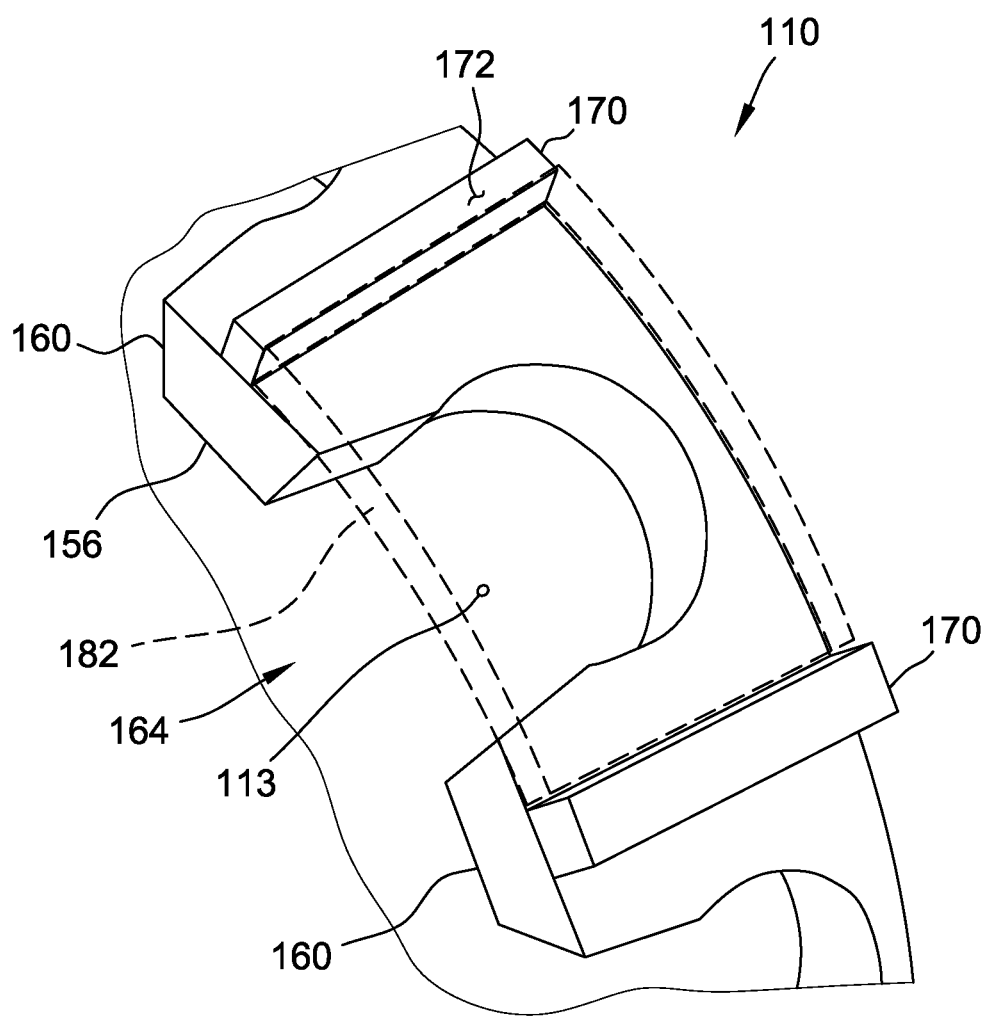
FIG. 6 is a partial perspective view of another embodiment of the present invention in the form of a bearing retainer with ribs with rectangularly shaped cross sections located on the outer periphery of the retainer.
Figure 7:
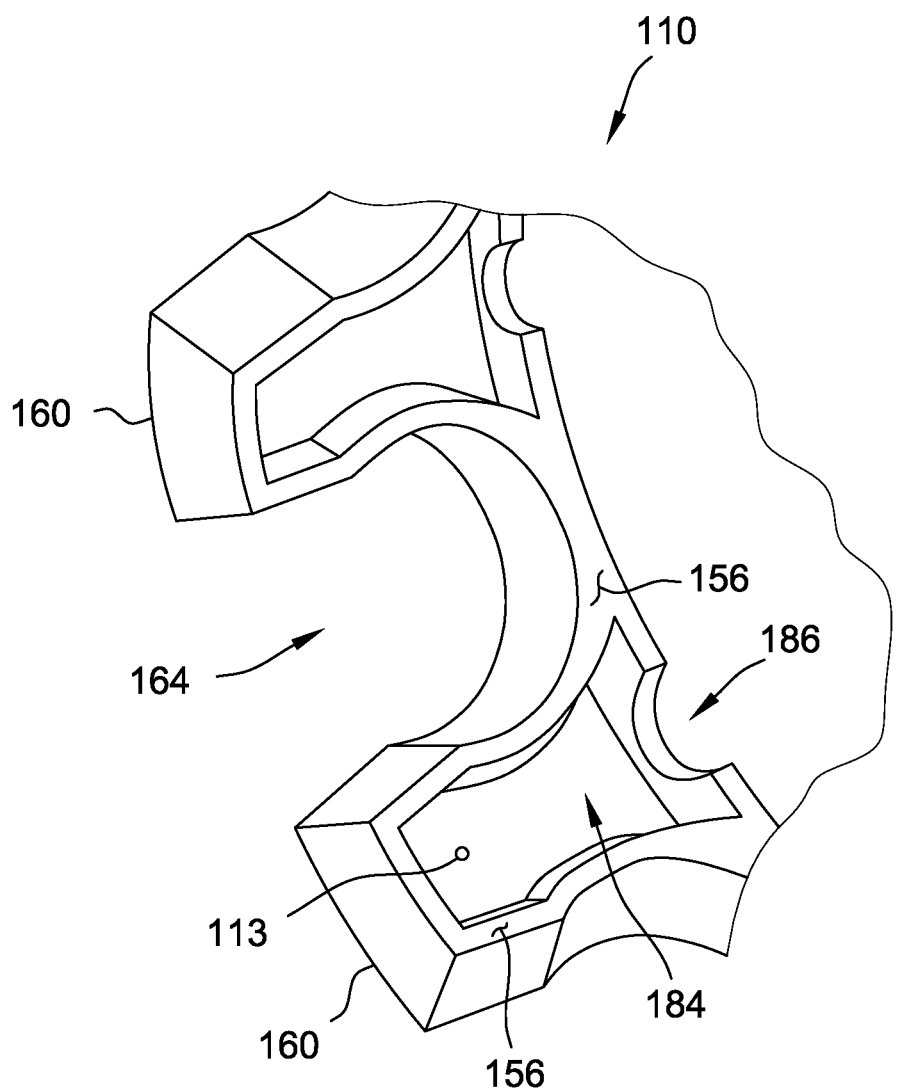
FIG. 7 is a partial perspective view of the bearing retainer of FIG. 6 showing grease retaining pockets formed in the inner periphery of the retainer.

Referring now to FIGS. 6 and 7, another aspect of the present invention is shown as retainer 110. Retainer 110 is similar to retainer 10, but retainer 110 is an outer ring guided retainer.

As shown in FIG. 6, the retainer 110 includes a plurality of spaced apart fingers 160 which defines pockets 164 for supporting rolling elements. The retainer 110 includes a radially outward surface 168 from which a plurality of rectangularly cross-sectioned ribs 170 extend. Distal surfaces 172 of the ribs 170 closely conform to the cylindrical outer lands of the outer ring. The ribs 170 define outer reservoirs 182 formed between adjacent ribs 170 for storing grease 113.

As shown in FIG. 7, the retainer 110 includes a plurality of finger cavities 184 for storing grease 113 formed in the inner periphery 156 of the fingers 160. A channel 186 provides a lubricant pathway for grease 113.

Figure 8:
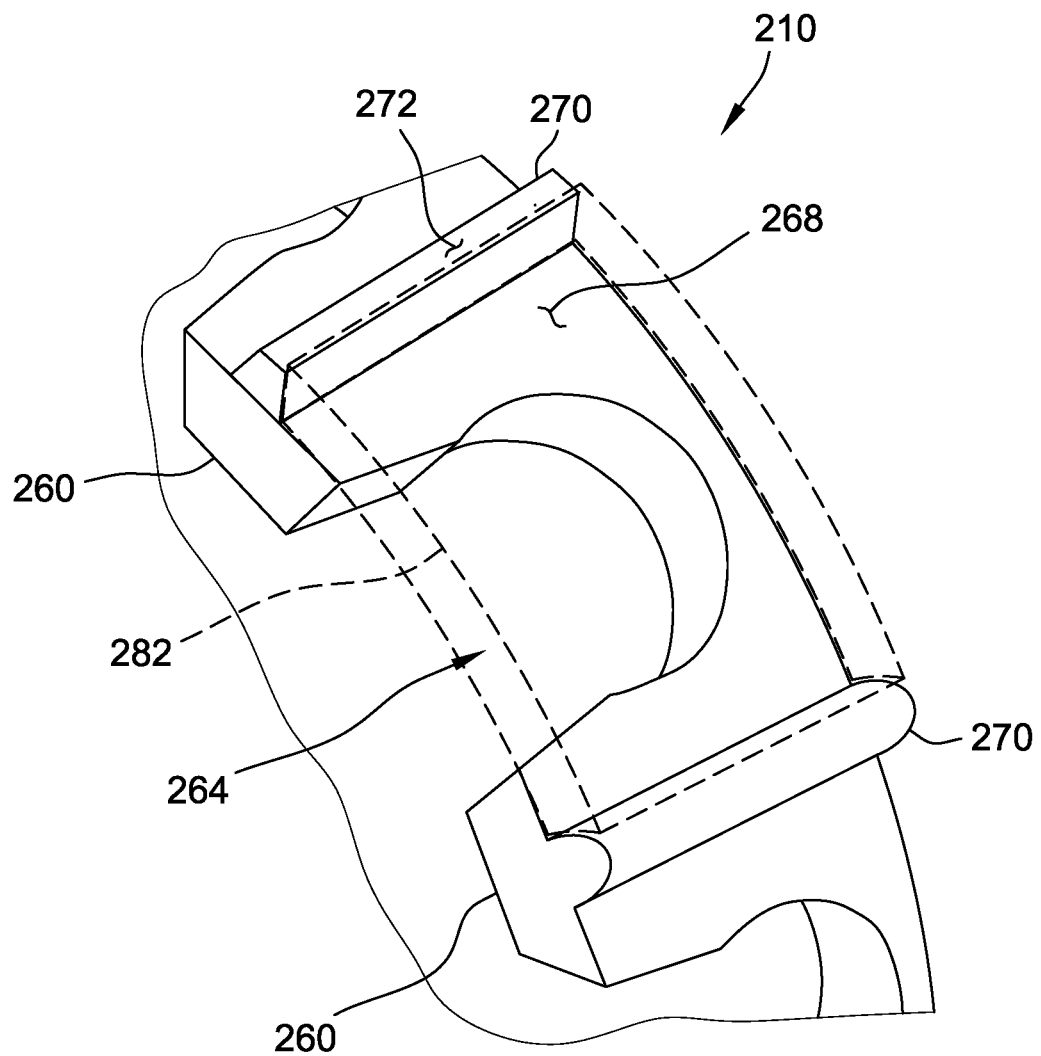
FIG. 8 is a partial perspective view of another embodiment of the present invention in the form of a bearing retainer with ribs located on the outer periphery of the retainer, the ribs have different cross sections than those of the retainer of FIG. 6.

Referring now to FIG. 8, another aspect of the present invention is shown as retainer 210. Retainer 210 is similar to retainer 210 and is also an outer ring guided retainer. The retainer 210 includes a plurality of spaced apart fingers 260 which defines pockets 264 for supporting rolling elements. The retainer 210 includes a radially outward surface 268 from which a plurality of trapezodial cross-sectioned ribs 270 extend. Note that the ribs may, alternatively be half-moon cross-sectioned ribs 270A. Distal surfaces 272 of the ribs 270 closely conform to the cylindrical outer lands of the outer ring. The ribs 270 define outer reservoirs 282 formed between adjacent ribs 270 for storing grease 213.

Figure 9:
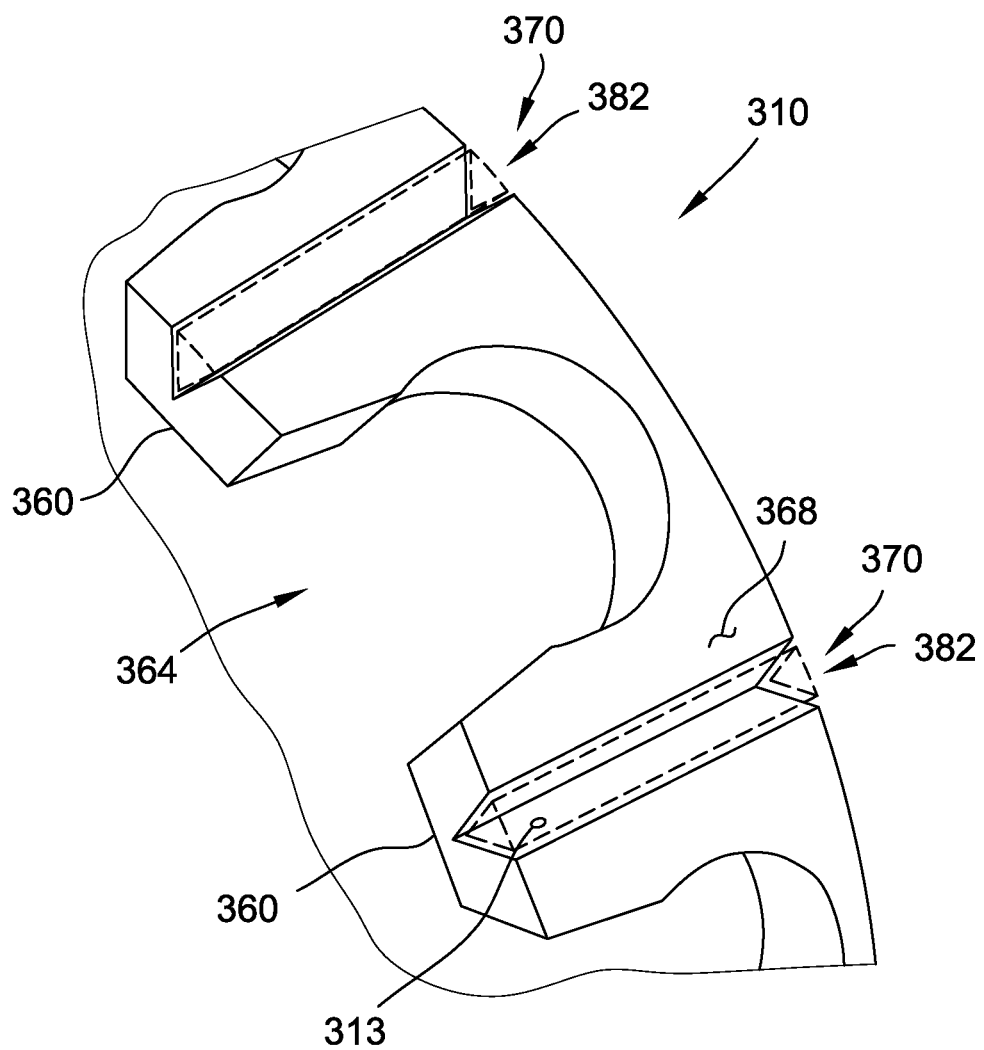
FIG. 9 is a partial perspective view of another embodiment of the present invention in the form of a bearing retainer with axially extending groove formed in the outer periphery of the retainer.

Referring now to FIG. 9, another aspect of the present invention is shown as retainer 310. Retainer 310 is similar to retainer 210 and is also an outer ring guided retainer. The retainer 310 includes a plurality of spaced apart fingers 360 which defines pockets 364 for supporting rolling elements. The retainer 310 includes a plurality of spaced apart axially extending triangularly cross-sectioned grooves 370 formed in a radially outward surface 368 of the retainer 310. Note that the grooves 370 may, alternatively be rectangularly or half-moon cross-sectioned ribs. The radially outward surface 368 of the retainer 310 closely conform to the cylindrical outer lands of the outer ring. The grooves 370 define outer reservoirs 382 formed in the grooves 370 for storing grease 313.

Figure 10:
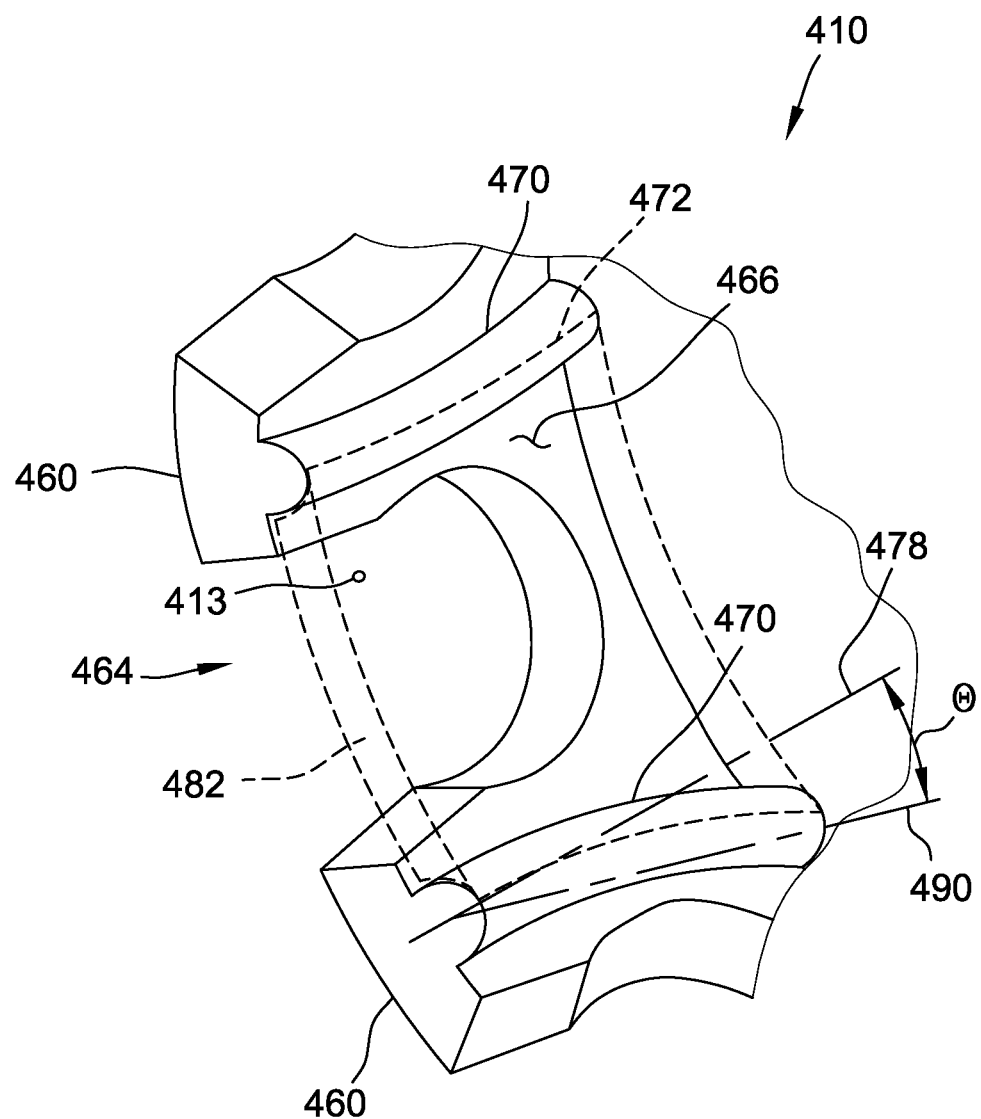
FIG. 10 is a partial perspective view of another embodiment of the present invention in the form of a bearing retainer showing transverse and skewed ribs with half mooned shaped cross sections located on the inner periphery of the retainer.

Referring now to FIG. 10, another aspect of the present invention is shown as retainer 410. Retainer 410 is similar to retainer 10 and is also an inner ring guided retainer. The retainer 410 includes a plurality of spaced apart fingers 460 which defines pockets 464 for supporting rolling elements. The retainer 410 includes a radially inward surface 466 from which a plurality of half-moon shaped ribs 470 are formed. Note that the ribs may, alternatively be rectangularly cross-sectioned shaped or trapezoidal cross-sectioned shaped ribs 470. Note that while the ribs 470 may as shown extend along the bearing rotational axis 478, it should be appreciated that at least some of the ribs 470 may extend in a skewed fashion, for example along skewed axis 490 oriented at an angle Θ relative to rotational axis 478. Distal surfaces 472 of ribs 470 closely conform to the cylindrical inner lands of the inner ring. The ribs 470 define inner reservoirs 482 between adjacent ribs 470 for storing grease 413.

Figure 11:
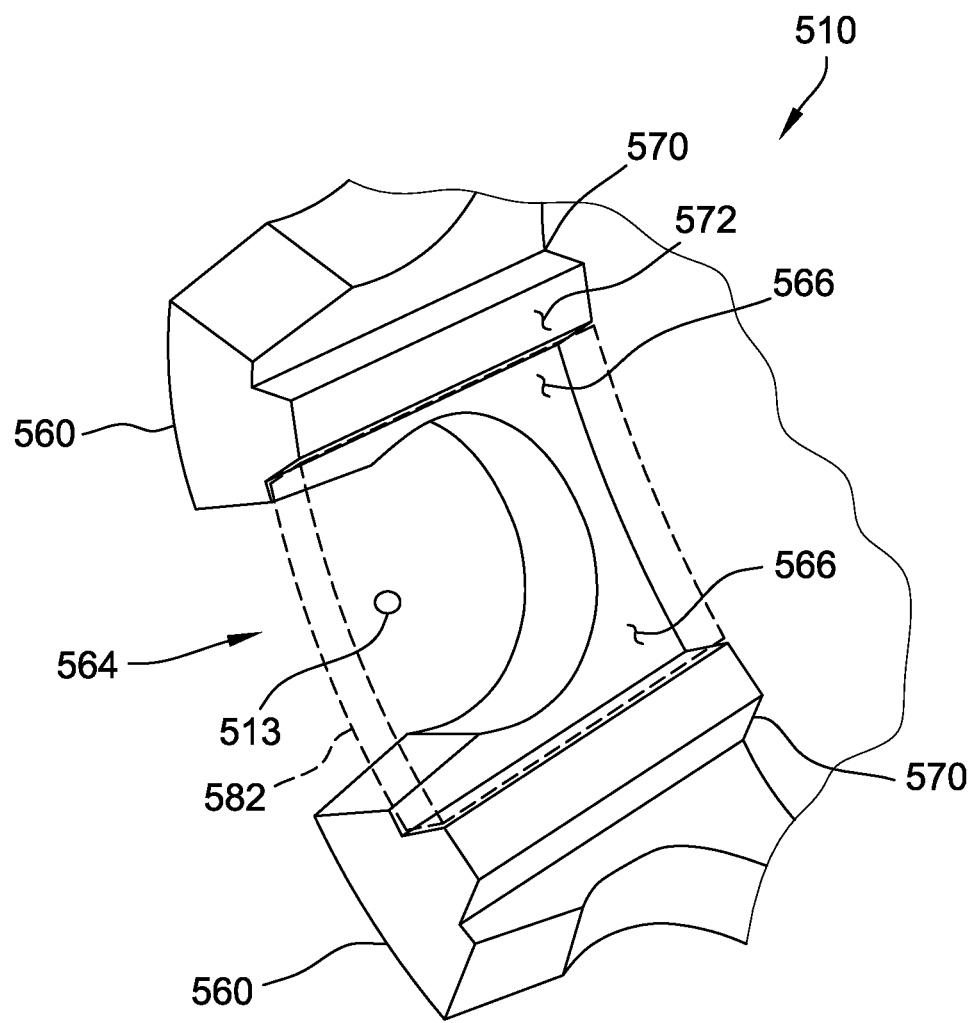
FIG. 11 is a partial perspective view of another embodiment of the present invention in the form of a bearing retainer showing transverse ribs with trapezoidally shaped cross sections located on the inner periphery of the retainer.

Referring now to FIG. 11, another aspect of the present invention is shown as retainer 510. Retainer 510 is similar to retainer 10 and is also an inner ring guided retainer. The retainer 510 includes a plurality of spaced apart fingers 560 which defines pockets 564 for supporting rolling elements. The retainer 510 includes a radially inward surface 566 from which a plurality of trapezoidal shaped ribs 570 are formed. Note that the ribs may, alternatively be rectangularly cross-sectioned shaped or half-moon cross-sectioned shaped ribs 570. Distal surfaces 572 of ribs 570 closely conform to the cylindrical inner lands of the inner ring. The ribs 570 define inner reservoirs 582 between adjacent ribs 570 for storing grease 513.

Figure 12:
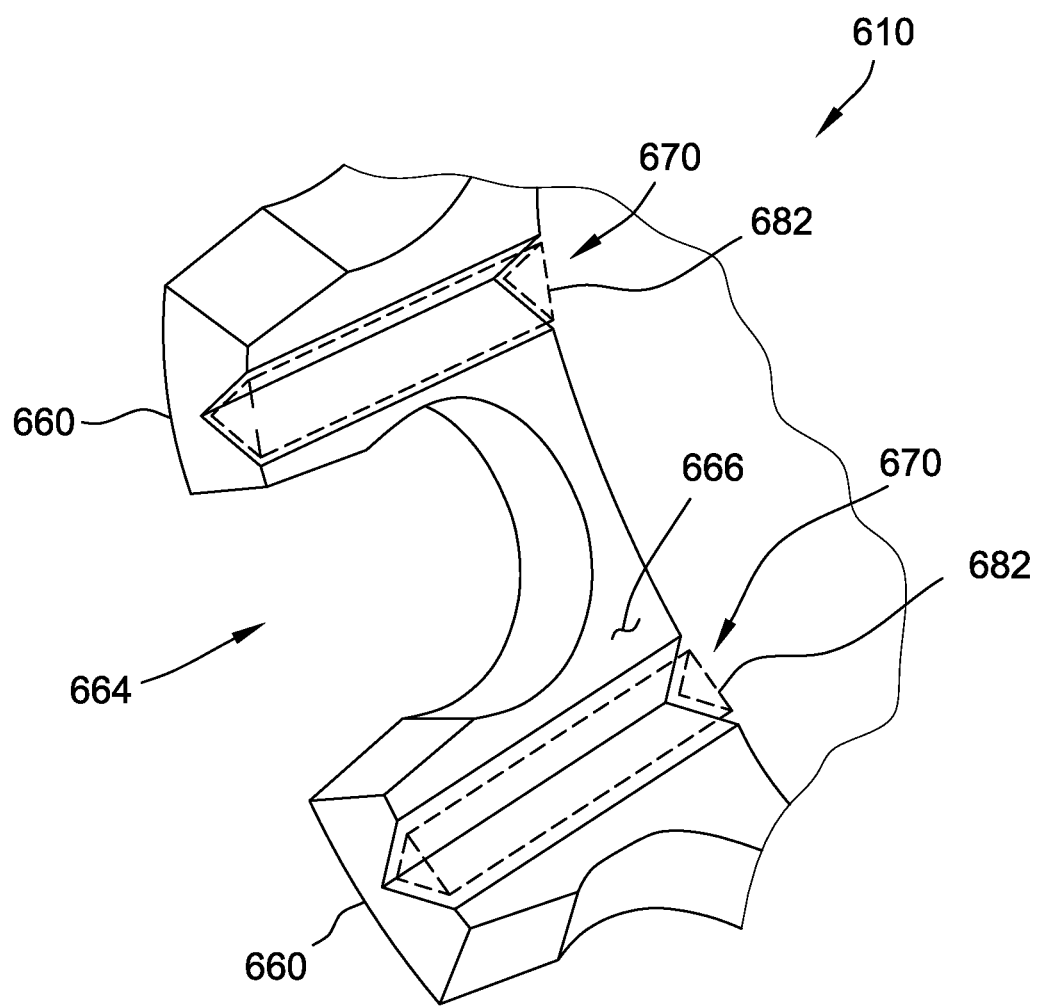
FIG. 12 is a partial perspective view of another embodiment of the present invention in the form of a bearing retainer showing transverse grooves with triangularly shaped cross sections located on the inner periphery of the retainer.

Referring now to FIG. 12, another aspect of the present invention is shown as retainer 610. Retainer 610 is similar to retainer 10 and is also an inner ring guided retainer. The retainer 610 includes a plurality of spaced apart fingers 660 which defines pockets 664 for supporting rolling elements. The retainer 610 includes a radially inward surface 666 from which a plurality of triangularly cross-sectioned shaped grooves 670 are formed. Note that the ribs may, alternatively be rectangularly cross-sectioned shaped or half-moon cross-sectioned shaped grooves 670. Radially inward surface 666 closely conform to the cylindrical inner lands of the inner ring. The grooves 670 define inner reservoirs 682 formed in grooves 670 for storing grease 613.

Figure 13:
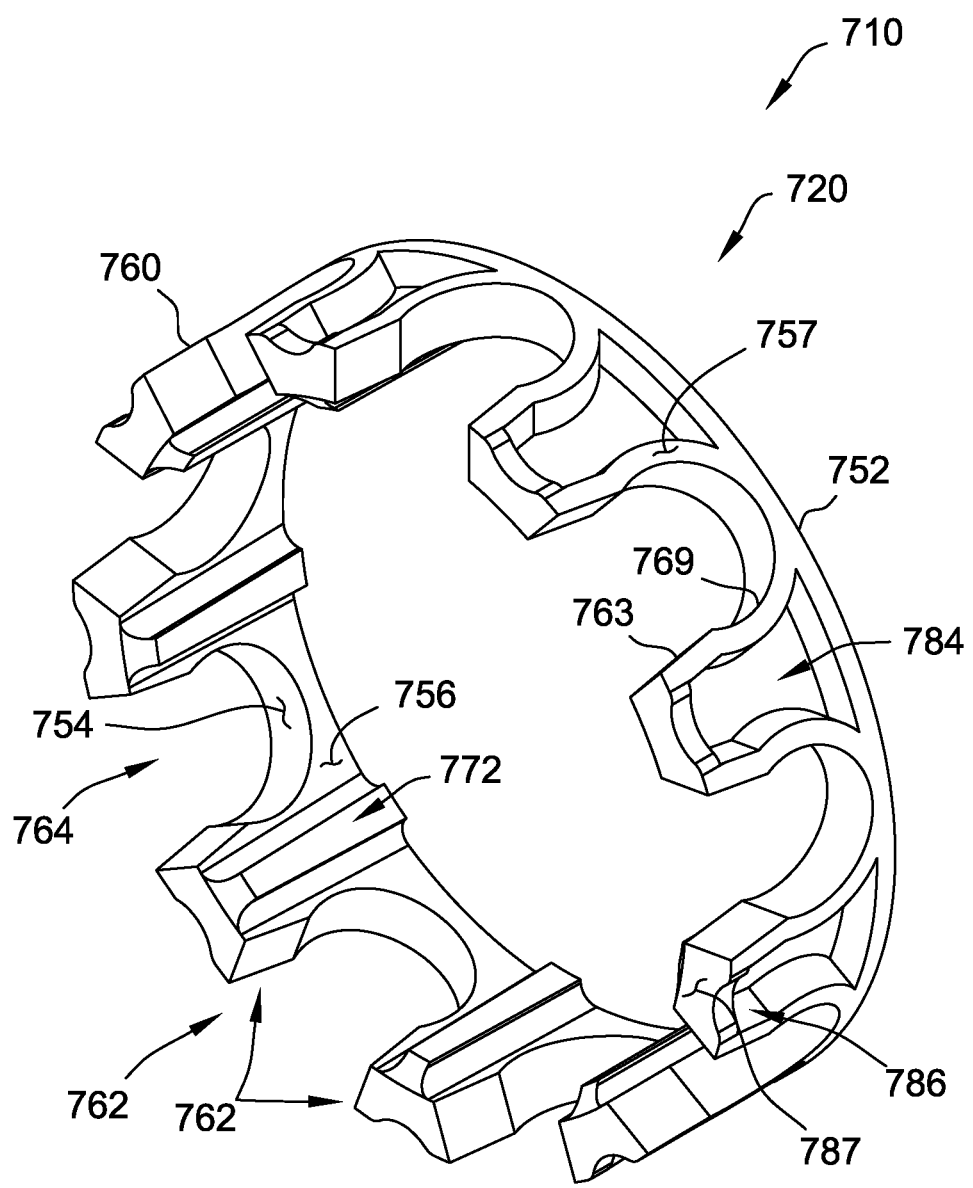
FIG. 13 is a perspective view of another embodiment of the present invention in the form of a bearing retainer that may be utilized in the cartridge of FIG. 2 and/or in the pillow block of FIG. 1 and that includes notches in the fingers of the retainer.
Figure 14:
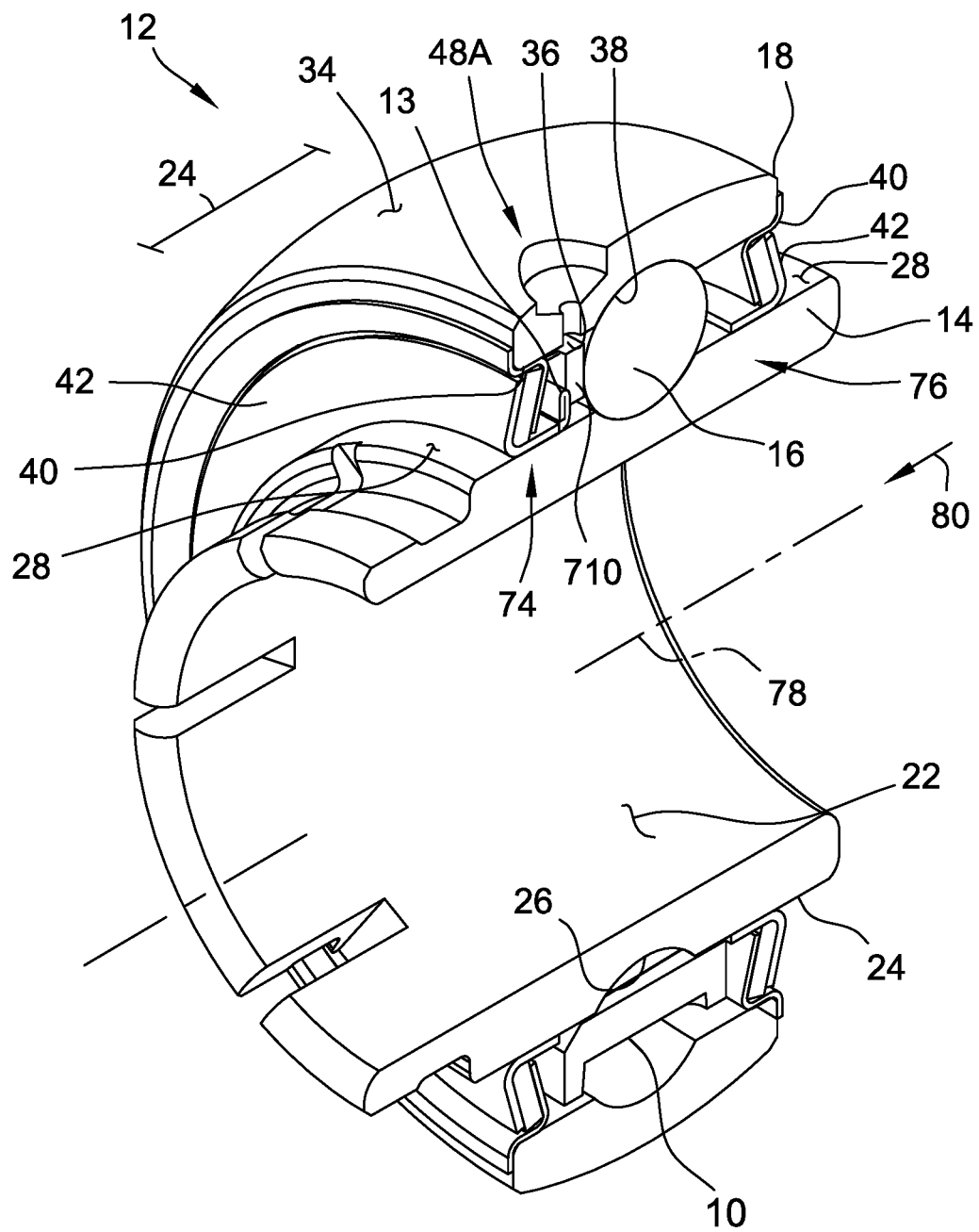
FIG. 14 is a perspective view of another embodiment of the present invention in the form of a bearing retainer that may be utilized in the cartridge of FIG. 2 and/or in the pillow block of FIG. 1 and that includes notches in both the fingers of the retainer and in the opposite side of the retainer.

Referring now to FIGS. 13 and 14, another aspect of the present invention is shown as retainer 710. Retainer 710 is similar to retainer 10 and is also an inner ring guided retainer.

As shown in FIG. 13, the retainer 710 body 720 has a first face 752, a second face 754 opposed to the first face 752, and an outer periphery 757 extending from the first face 752 to the second face 754. The body 720 also has an inner periphery 756 extending from the first face 752 to the second face 754. The inner periphery 756 defines a central opening 758 in the body 720. The body 720 also has a plurality of spaced apart protrusions or fingers 760 extending outwardly from the second face 754. The fingers 760 serve to separate and guide the rolling elements or balls 16 (see FIG. 14).

Adjacent pairs 762 of the plurality of fingers 760 define pockets 764 between the fingers 760. Each pocket 764 guides one of the rolling elements 16. The fingers 760 may have guiding surfaces 765 that contact the rolling elements 16. When as shown the rolling elements 16 are spheres or balls, the guiding surfaces 765 are preferably concave to closely conform to the balls 16. Each of the plurality of spaced apart protrusions 760 define a radially inward surface 766 and an opposed radially outward surface 768 opposed to the radially inward surface 766. A rib 770 extends inwardly from radially inward surface 766 and is used to support the retainer 710 on inner ring 14 and to permit grease 13 to flow between the inner ring 14 and the retainer 710 (see FIG. 14). The rib 770 includes a distal surface 772 that mates with the cylindrical inner lands 28 of inner ring 14 of the bearing 12. As the cylindrical inner lands 28 are convex, the distal surface 772 may be concave to match the lands 28. Alternatively, the distal surface 772 may be flat or planar.

A first pathway or first channel 786 may be formed in the retainer 10 in distal end 787 of finger 760 and leads to finger outer cavity or reservoir 784 of the retainer 710. The first pathway or first channel 786 may have any shape and may as shown be semicircular. To provide sufficient grease 13, the first pathway 786 may be, as shown, open at outer periphery 757 of retainer 710. Any other shape for the first pathway 786 may be used. For example, the pathway may be circular, rectangular or any other shape. As shown in FIG. 13 a plurality of first channels 786 may be utilized in the retainer 710. For example and as shown in FIG. 13, one first channel 786 is associated with each of the finger cavities or reservoirs 784.

As shown in FIGS. 13 and 14, to advance grease in the direction of arrow 80 toward the finger cavities 784 (see FIG. 13), grease 13 from the opposed side cavity 776 may be advanced through the first pathway or first channel 786 and between the outer land 40 and retainer 710. As the bearing 12 and retainer 710 rotate with use, grease 13 remains within the bearing 12 in finger cavities 784 in ample supply and adjacent to the bearing outer race 38. Note that retainer 710 may be used when radially extending opening 48A is formed in outer ring 18 to permit the grease 13 to enter the bearing 12 and be stored between the seals 42 and when the retainer 710 has its fingers 760 oriented toward the radially extending opening 48A.

It should be appreciated that the first channel 786 may be alternately positioned in the chamfered wall 763 of the retainer 710 or in the pocket wall 763 of the retainer 710.

It should be appreciated that the first channel 786 may have any suitable shape and may be an opening instead of a notch as shown in FIG. 13. The first channel if an opening may have any cross-sectional shape, for example, round square, rectangular, oval or any other geometric or non-geometric shape and may have a varying cross section.

Figure 15:
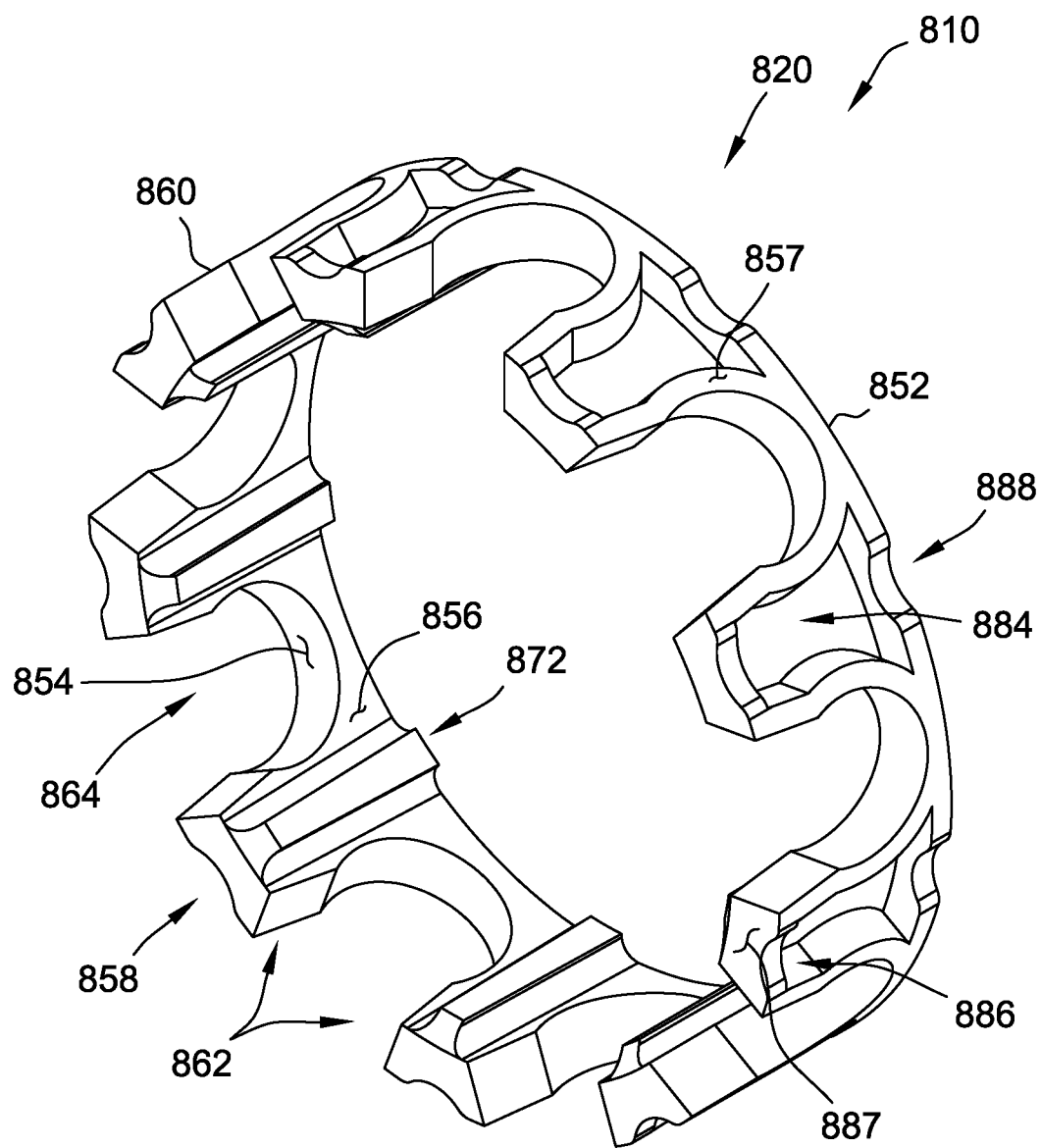
FIG. 15 is a perspective view, partially in cross section, of an embodiment of the present invention in the form of a bearing cartridge or enclosed bearing assembly that may be used in the pillow block of FIG. 1 showing a retainer with fingers pointing away from collar.

Referring now to FIG. 15, another aspect of the present invention is shown as retainer 810. Retainer 810 is similar to retainer 10 and is also an inner ring guided retainer.

As shown in FIG. 15, the retainer 810 includes a body 820 that has a first face 852, a second face 854 opposed to the first face 852, and an outer periphery 857 extending from the first face 852 to the second face 854. The body 820 also has an inner periphery 856 extending from the first face 852 to the second face 854. The inner periphery 856 defines a central opening 858 in the body 820. The body 820 also has a plurality of spaced apart protrusions or fingers 860 extending outwardly from the second face 854. The fingers 860 serve to separate and guide the rolling elements or balls 16 (see FIG. 2).

Adjacent pairs 862 of the plurality of fingers 860 define pockets 864 between the fingers 860. Each pocket 864 guides one of the rolling elements 16. The fingers 860 may have guiding surfaces 865 that contact the rolling elements 16. When as shown the rolling elements 16 are spheres or balls, the guiding surfaces 865 are preferably concave to closely conform to the balls 16. Each of the plurality of spaced apart protrusions 860 define a radially inward surface 866 and an opposed radially outward surface 868 opposed to the radially inward surface 866. A rib 870 extends inwardly from radially inward surface 866 and is used to support the retainer 810 on inner ring 14 (see FIG. 2) and to permit grease 13 (see FIG. 2) to flow between the inner ring 14 (see FIG. 2) and the retainer 810 (see FIG. 15). The rib 870 includes a distal surface 872 that mates with the cylindrical inner lands 28 (see FIG. 2) of inner ring 14 (see FIG. 2) of the bearing 12 (see FIG. 2). As the cylindrical inner lands 28 (see FIG. 2) are convex, the distal surface 872 may be concave to match the lands 28. Alternatively, the distal surface 872 may be flat or planar.

A first pathway or first channel 886 may be formed in the retainer 810 in distal end 887 of finger 860 and leads to finger outer cavity or reservoir 884 of the retainer 810. The first pathway or first channel 886 may have any shape and may as shown be semicircular. To provide sufficient grease, the first pathway 886 may be, as shown, open at outer periphery 857 of retainer 810. Any other shape for the first pathway 886 may be used. For example, the pathway may be circular, rectangular or any other shape.

A second pathway or second channel 888 may be formed in the retainer 810 between the finger cavity 884 and first face 852 of the retainer 810 and leads from first face 852 to cavity 884 of the retainer 810. The second pathway or second channel 888 may have any shape and may as shown be semicircular. To provide sufficient grease, the first pathway 886 may be, as shown, open at outer periphery 857 of retainer 810. Any other shape for the second pathway or second channel 888 may be used. For example, the pathway may be circular, rectangular or any other shape.

To advance grease in the direction of arrow 80 (see FIG. 2) toward the finger cavities 884 (see FIG. 15), grease from the opposed side cavity 886 may be advanced through the first pathway or first channel 886 and between the outer land 40 and retainer 810. As the bearing 12 (see FIG. 2) and retainer 810 rotate with use, grease remains within the bearing 12 in finger cavities 884 in ample supply and adjacent to the bearing outer race 38 (see FIG. 2). Note that retainer 810 may be used when either the radially extending opening 48 (see FIG. 2) or the radially extending opening 48A (see FIG. 14) are formed in outer ring 18 to permit the grease 13 to enter the bearing 12 and be stored between the seals 42 and either when the retainer 810 has its fingers 860 oriented toward the radially extending opening 48A or when the retainer 810 has its fingers 860 oriented toward the radially extending opening 48.

Figure 16A:
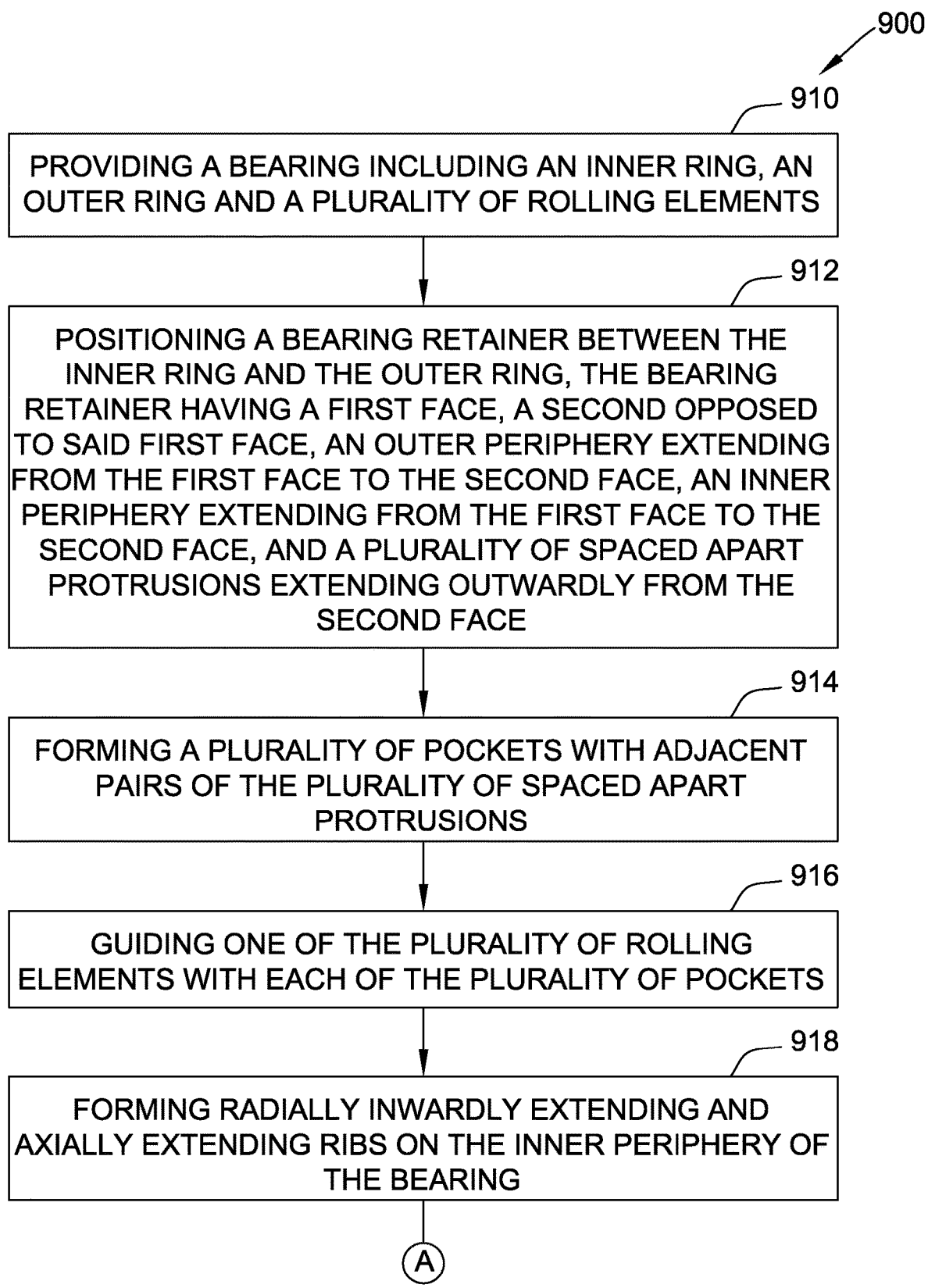
FIG. 16A show a first portion of a schematic flow chart of a method for guiding and lubricating rolling elements in a bearing according to an embodiment of the present invention.
Figure 16B:
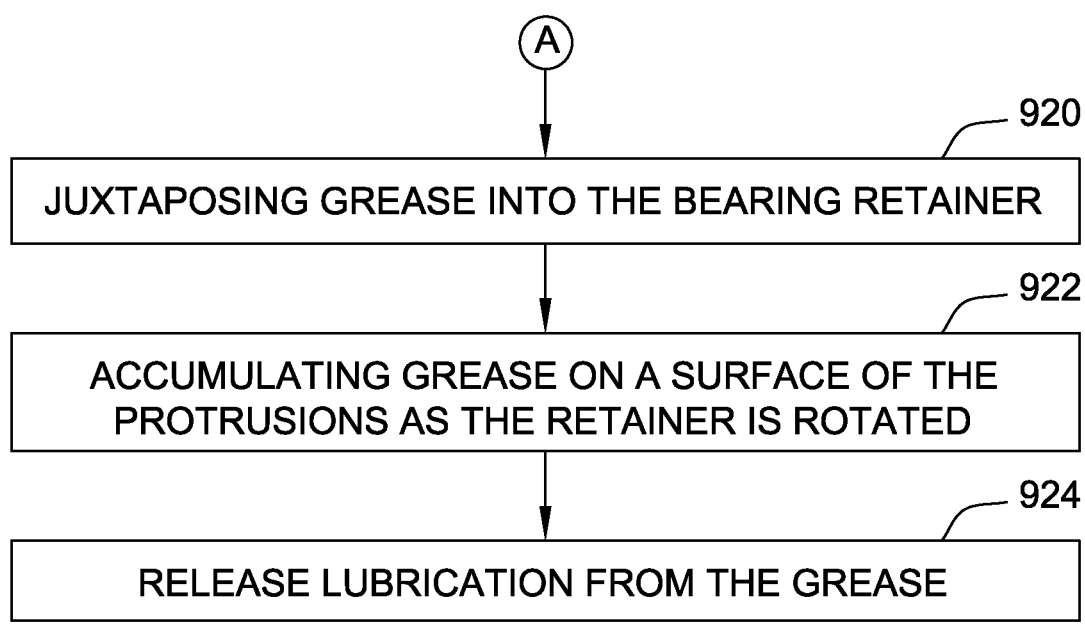
FIG. 16B show a second portion of a schematic flow chart of a method for guiding and lubricating rolling elements in a bearing according to an embodiment of the present invention.

According to another aspect of the invention and referring now to FIG. 16A and FIG. 16B, a method 900 for guiding and lubricating rolling elements in a bearing is provided. The method includes step 910 of providing a bearing having an inner ring, an outer ring and a plurality of rolling elements. The method also includes step 912 of positioning a bearing retainer between the inner ring and the outer ring. The bearing retainer has a first face, a second face opposed to the first face, an outer periphery extending from the first face to the second face, an inner periphery extending from the first face to the second face, and a plurality of spaced apart protrusions extending outwardly from the second face.

The method also includes step 914 of forming a plurality of pockets with adjacent pairs of the plurality of spaced apart protrusions and step 916 of guiding one of the plurality of rolling elements with each of the plurality of pockets.

The method also includes step 918 of forming radially inwardly extending and axially extending ribs on the inner periphery of the bearing retainer and step 920 of juxtaposing grease into the bearing retainer;

The method also includes step 922 of accumulating grease on a surface of the protrusions as the retainer is rotated and step 924 of releasing lubrication from the grease.

According to another aspect of the invention, the method may be provided wherein the step 912 of positioning a bearing retainer includes the step of closely conforming the outer periphery of the retainer to the outer ring.

The methods, systems, and apparatus described herein facilitate efficient and economical assembly of a bearing assembly. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing bearing retainers that reduce costs, enhance rolling element guidance, or improve lubrication. Furthermore, the exemplary methods system and apparatus achieve improved bearing life while reducing bearing wear and noise. The methods, system and apparatus described herein may be used in any suitable application.

Exemplary embodiments of the bearings, bearing assemblies and the bearing retainers are described above in detail. The bearing assemblies and bearing retainers are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:

1. A bearing retainer for use in a bearing including an inner ring, rolling elements and an outer ring, the bearing retainer comprising a generally cylindrical body, said body defining:
   a first face;
   a second face opposed to said first face;
   an outer periphery extending from the first face to the second face;
   an inner periphery extending from the first face to the second face, said inner periphery defining a central opening in said body;
   a plurality of spaced apart protrusions extending outwardly from the second face, adjacent pairs of the plurality of spaced apart protrusions defining a pocket therebetween for guiding one of the rolling elements, each of the plurality of spaced apart protrusions defining opposed radially inward and radially outward surfaces; and
   a plurality of axially-oriented parallel ribs extending radially inward from said radially inward surface, wherein adjacent ribs define an inner cavity therebetween for receiving and storing lubricant, wherein the inner cavity extends from said first face to said second face.

2. The bearing retainer in accordance with claim 1, wherein at least one of the radially outward surfaces of the plurality of spaced apart protrusions define a radially inwardly extending cavity for receiving and storing lubricant.

3. The bearing retainer in accordance with claim 2, wherein the said body defines a passageway therein, the passageway extending from the second face to the radially inwardly extending cavity.

4. The bearing retainer in accordance with claim 3, wherein at least one of the ribs has a generally rectangular cross section in a plane normal to an axis of rotation of said body.

5. The bearing retainer in accordance with claim 1, wherein each of the ribs is centrally aligned with respect to adjacent pockets.

6. The bearing retainer in accordance with claim 1, wherein each of the plurality of spaced apart protrusions define a shoulder for limiting the axial movement of the rolling element toward the first face of said body.

7. The bearing retainer in accordance with claim 1, wherein each of the pockets closely conforms to one of the rolling element.

8. The bearing retainer in accordance with claim 1, wherein each of the pockets has a concave surface closely conforming to a convex surface of one of the rolling element.

9. The bearing retainer in accordance with claim 1, wherein the outer periphely of said body closely conforms to the outer ring of the bearing.

10. A bearing, comprising:
    an inner ring defining an inner race;
    an outer ring defining an outer race;

a plurality of rolling elements adapted to move along the inner race and a bearing retainer positioned between the inner ring and the outer ring and including a generally cylindrical body, the body defining:
a first face;
a second face opposed to said first face;
an outer periphery extending from the first face to the second face;
an inner periphery extending from the first face to the second face, said inner periphery defining a central opening in said body; and
a plurality of spaced apart protrusions extending outwardly from the second face, adjacent pairs of the plurality of spaced apart protrusions defining a pocket therebetween for guiding one of the rolling elements, each of the plurality of spaced apart protrusions defining opposed radially inward and radially outward surfaces; and
a plurality of axially-oriented parallel ribs extending radially inward from said radially inward surface, wherein adjacent ribs define an inner cavity therebetween for receiving and storing lubricant, wherein the inner cavity extends from said first face to said second face.

11. The bearing in accordance with claim 10, wherein at least one of the radially outward surfaces of the plurality of spaced apart protrusions define a radially inwardly extending cavity for receiving and storing lubricant.

12. The bearing in accordance with claim 11, wherein the radially inwardly extending cavity and the pocket are defined by a wall of generally constant thickness therebetween.

13. The bearing in accordance with claim 11, wherein the said body defines a passageway therein, the passageway extending from the second face to the radially inwardly extending cavity.

14. The bearing in accordance with claim 13, wherein the passageway extends to the outer periphery of said body.

15. The bearing in accordance with claim 10, wherein at least one of the ribs has a generally rectangular cross section in a plane normal to an axis of rotation of said body.

16. The bearing retainer in accordance with claim 10, wherein at least one of the ribs is tapered in the direction of an axis of rotation of said body.

17. The bearing retainer in accordance with claim 10, wherein each of the plurality of spaced apart protrusions define a shoulder for limiting the axial movement of the rolling element toward the first face of said body.

18. The bearing retainer in accordance with claim 10, wherein at least one of the ribs is skewed in the direction of an axis of rotation of said body.

19. A method for guiding and lubricating rolling elements in a bearing, said method comprises the steps of:
providing a bearing including an inner ring, an outer ring and a plurality of rolling elements;
positioning a bearing retainer between the inner ring and the outer ring, the bearing retainer having a first face, a second face opposed to said first face, an outer periphery extending from the first face to the second face, an inner periphery extending from the first face to the second face, and a plurality of spaced apart protrusions extending outwardly from the second face;
forming a plurality of pockets with adjacent pairs of the plurality of spaced apart protrusions;
guiding one of the plurality of rolling elements with each of the plurality of pockets;
forming radially inwardly extending and axially extending ribs on the inner periphery of the bearing retainer to define an inner cavity between adjacent ribs, wherein the inner cavity extends from the first face to the second face;
juxtaposing grease into the bearing retainer;
accumulating grease in the inner cavity and on a surface of the protrusions as the retainer is rotated; and
releasing lubrication from the grease.

20. The method as in claim 19, wherein the step of positioning a bearing retainer comprises the step of closely conforming the outer periphery of the retainer to the outer ring.

* * * * *